(12) United States Patent
Steenhoek et al.

(10) Patent No.: US 10,746,376 B2
(45) Date of Patent: Aug. 18, 2020

(54) SYSTEM FOR MATCHING COARSENESS APPEARANCE OF COATINGS

(71) Applicant: AXALTA COATING SYSTEMS IP CO., LLC, Wilmington, DE (US)

(72) Inventors: Larry E. Steenhoek, Wilmington, DE (US); Wolfgang Kuepper, Wuppertal (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 253 days.

(21) Appl. No.: 15/659,430

(22) Filed: Jul. 25, 2017

(65) Prior Publication Data

US 2019/0032888 A1    Jan. 31, 2019

(51) Int. Cl.
| | |
|---|---|
| *F21V 9/08* | (2018.01) |
| *G01J 3/46* | (2006.01) |
| *G01J 3/50* | (2006.01) |
| *G01J 3/10* | (2006.01) |
| *G01J 3/52* | (2006.01) |
| *G01J 3/02* | (2006.01) |
| G01J 3/12 | (2006.01) |

(52) U.S. Cl.
CPC .............. *F21V 9/08* (2013.01); *G01J 3/0272* (2013.01); *G01J 3/10* (2013.01); *G01J 3/463* (2013.01); *G01J 3/465* (2013.01); *G01J 3/504* (2013.01); *G01J 3/52* (2013.01); *G01J 2003/104* (2013.01); *G01J 2003/106* (2013.01); *G01J 2003/1213* (2013.01)

(58) Field of Classification Search
CPC ... F21V 9/08; G01J 3/0272; G01J 3/10; G01J 3/463; G01J 3/504
See application file for complete search history.

(56) References Cited

U.S. PATENT DOCUMENTS

| | | | | |
|---|---|---|---|---|
| 3,916,168 | A * | 10/1975 | McCarty | G01J 3/0251 356/405 |
| 7,443,508 | B1 | 10/2008 | Vrhel | |
| 8,743,364 | B2 * | 6/2014 | Krause | G01J 3/46 356/408 |
| 9,080,915 | B2 | 7/2015 | Krause et al. | |
| 2009/0157212 | A1 * | 6/2009 | McClanahan | G01J 3/46 700/107 |
| 2013/0334507 | A1 * | 12/2013 | Shimoji | F21V 9/08 257/40 |

(Continued)

OTHER PUBLICATIONS

European Patent Office, European Search Report for European Patent Application No. EP 18 18 5447, dated Dec. 17, 2018.

*Primary Examiner* — Maurice C Smith
(74) *Attorney, Agent, or Firm* — Lorenz & Kopf, LLP

(57) ABSTRACT

Systems and method for matching appearance of a target coating on a substrate is provided herein. The system includes a coating chip including a chip coating layer. The chip coating layer has a chip coarseness. The system further includes an illumination component configured to illuminate the chip coating layer with a light having an illumination color. The chip coating layer exhibits the chip coarseness and the illumination color in the presence of the light having the illumination color. The chip coating layer exhibiting the chip coarseness and the illumination color is utilized for matching the appearance of the target coating.

5 Claims, 5 Drawing Sheets

(56) References Cited

U.S. PATENT DOCUMENTS

2014/0078293 A1* 3/2014 Beymore ............... G01J 3/504
348/135
2015/0263240 A1 9/2015 Tomizawa et al.
2016/0140734 A1* 5/2016 Kato ................... G06K 9/4642
348/222.1

* cited by examiner

SYSTEM FOR MATCHING COARSENESS APPEARANCE OF COATINGS

TECHNICAL FIELD

The technical field is directed to a system and a method for matching appearance of a target coating on a substrate. This disclosure is particularly directed to a system and a method for matching coarseness appearance of a target coating on a substrate.

BACKGROUND

Besides colorants or color pigments, effect pigments, such as metallic flakes, are widely used for producing coatings having desired appearance and aesthetic effects. The use of effect pigments in a coating can impart a differential light reflection effect, color changing effect upon varying viewing or illumination conditions, sparkle effect, coarseness, as well as the enhancement of depth perception in the coating. Aluminum flakes, a type of metallic flakes, are commonly used as effect pigments in coatings for automobile bodies and other articles. For repairing a previously coated article that has a coating including effect pigments, for example, an automotive body, it is necessary to choose the correct colorants or colorant combinations to match the color of that coated article as well as the correct effect pigments such as flakes to match both the color and appearance of that coated article.

In many instances, matching the color and appearance of a coated article requires comparing the color and appearance of the coated article to a plurality of coating chips of a fandeck under "white light" conditions. However, coatings including effects pigments typically exhibit a coarseness appearance that must be matched separately from the color. When attempting to match the coarseness appearance of a coated article, a plurality of coating chips including a range of coarseness values are compared to the coarseness appearance of the coated article. The coating chips typically have a neutral color or achromatic color, such as a silver color, while the coated article may have a chromatic color, such as a red color. Judging a chromatic coated article against a neutral coating chip for a proper coarseness value under "white light" conditions is difficult due to the large color difference between the coating chip and the coated article. Alternatively, coating chips may be keyed to specific colors and coarseness appearances that may be utilized to match the coarseness appearance of a coated article. However, the vast number of coating chips necessary to be generated to account for all colors utilized in the market is expensive and burdensome to maintain year after year.

Accordingly, there are needs for more effectively and efficiently matching coarseness appearance of a target coating of a coated article. Furthermore, other desirable features and characteristics will become apparent from the subsequent detailed description and the appended claims, taken in conjunction with this background.

BRIEF SUMMARY

A system for matching appearance of a target coating on a substrate is provided herein. The system includes a coating chip including a chip coating layer. The chip coating layer has a chip coarseness. The system further includes an illumination component configured to illuminate the chip coating layer with a light having an illumination color. The chip coating layer exhibits the chip coarseness and the illumination color in the presence of the light having the illumination color. The chip coating layer exhibiting the chip coarseness and the illumination color is utilized for matching the appearance of the target coating.

A method for matching appearance of a target coating on a substrate is also provided herein. The method includes providing a coating chip comprising a chip coating layer having a chip coarseness. The method further includes providing a second coating chip including a second chip coating layer having a second chip coarseness. The method also includes illuminating the chip coating layer with a light having an illumination color. The chip coating layer exhibits the chip coarseness and the illumination color in the presence of the light having the illumination color. The method further includes utilizing the chip coating layer exhibiting the chip coarseness and the illumination color for matching the appearance of the target coating.

BRIEF DESCRIPTION OF DRAWING

The present embodiments will hereinafter be described in conjunction with the following drawing figures, wherein like numerals denote like elements, and wherein.

DETAILED DESCRIPTION

Figure 1:
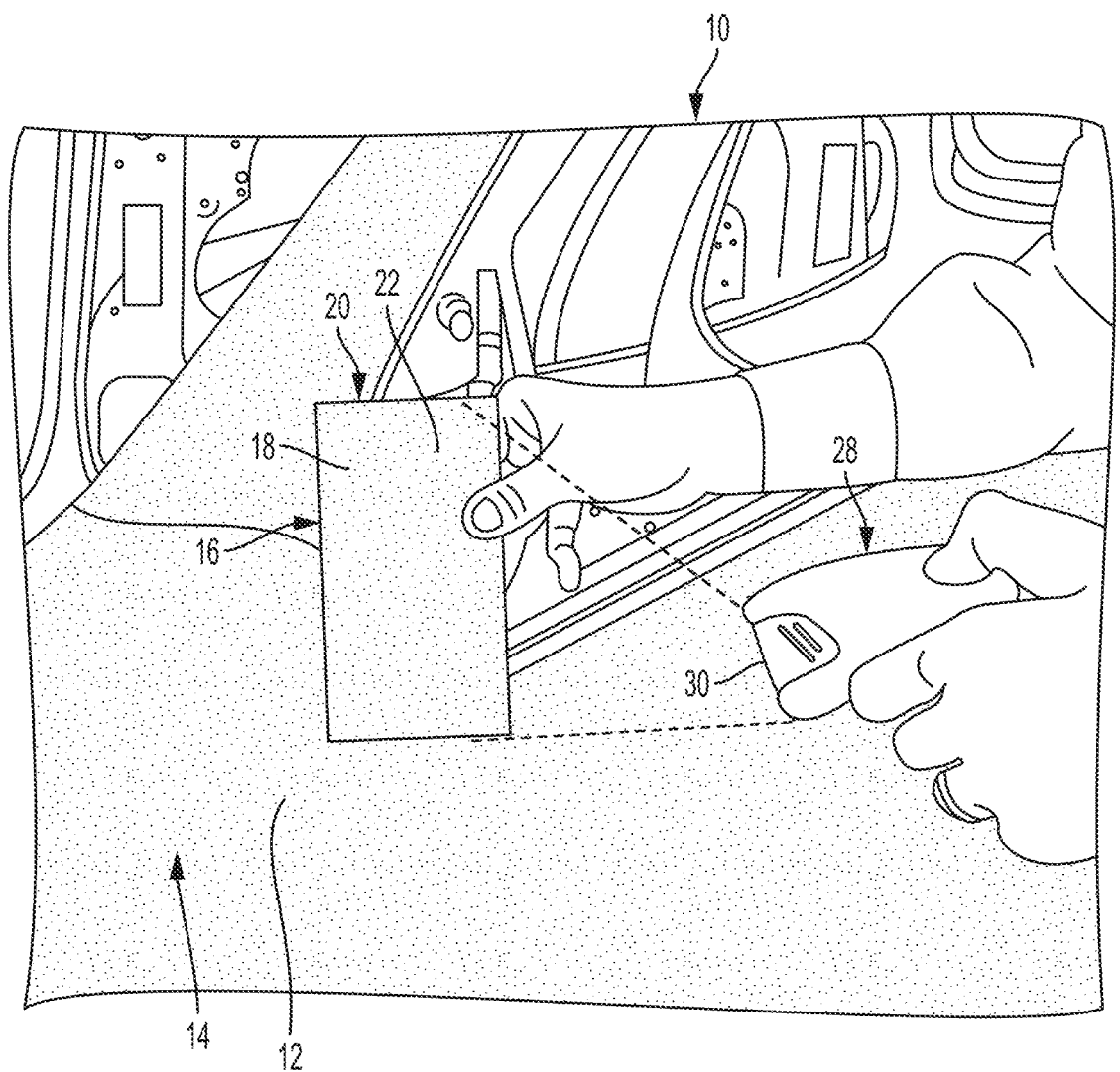
FIG. 1 is a schematic illustrating a non-limiting embodiment of a system for matching appearance of a target coating on a substrate utilizing a first coating chip.

The following detailed description is merely exemplary in nature and is not intended to limit coating compositions as described herein. Furthermore, there is no intention to be bound by any theory presented in the preceding background or the following detailed description.

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein, the term "pigment" or "pigments" refers to a colorant or colorants that produce color or colors. A pigment can be from natural or synthetic sources and can be made of organic or inorganic constituents. Pigments can also include metallic particles or flakes with specific or mixed shapes and dimensions. A pigment is usually not soluble in a coating composition.

The term "effect pigment" or "effect pigments" refers to pigments that produce special effects in a coating. Examples of effect pigments include, but not limited to, light scattering pigments, light interference pigments, and light reflecting pigments. Flakes, such as metallic flakes, for example aluminum flakes, are examples of such effect pigments. Effect pigments can also include pearlescent pigments.

The term "gonioapparent flake" or "gonioapparent flakes" refers to flakes which change color or appearance, or a combination thereof, with change in viewing angles or illumination conditions including, not limited to illumination light intensities, illumination spectral power distributions, illumination light angles, and a combination thereof. Metallic flakes, such as aluminum flakes are examples of gonio apparent flakes.

The term "dye" means a colorant or colorants that produce color or colors. Dye is usually soluble in a coating composition.

The term "appearance" can include: (1) the aspect of visual experience by which a coating is viewed or recognized; and (2) perception in which the spectral and geometric aspects of a coating is integrated with its illuminating and viewing environment. In general, appearance includes texture, coarseness, sparkle, or other visual effects of a coating, especially when viewed from varying viewing angles and/or with varying illumination conditions. Appearance characteristics or appearance data can include, but not limited to, descriptions or measurement data on texture, metallic effect, pearlescent effect, gloss, distinctness of image, flake appearances and sizes such as texture, coarseness, sparkle, glint and glitter as well as the enhancement of depth perception in the coatings imparted by the flakes, especially produced by metallic flakes, such as aluminum flakes. Appearance characteristics can be obtained by visual inspection or by using an appearance measurement device.

The term "color data" or "color characteristics" of a coating can comprise measured color data including spectral reflectance values, X,Y,Z values, L,a,b values, L*,a*,b* values, L,C,h values, or a combination thereof. Color data can further comprise a color code of a vehicle, a color name or description, or a combination thereof. Color data can even further comprise visual aspects of color of the coating, chroma, hue, lightness or darkness. The color data can be obtained by visual inspection, or by using a color measurement device such as a colorimeter, a spectrophotometer, or a goniospectrophotometer. The color data can also comprise descriptive data, such as a name of a color, a color code of a vehicle; a binary, textural or encrypted data file containing descriptive data for one or more colors; a measurement data file, such as those generated by a color measuring device; or an export/import data file generated by a computing device or a color measuring device. Color data can also be generated by an appearance measuring device or a color-appearance dual measuring device.

The term "coating" or "coating composition" can include any coating compositions known to those skilled in the art and can include a two-pack coating composition, also known as "2K coating composition"; a one-pack or 1K coating composition; a coating composition having a crosslinkable component and a crosslinking component; a radiation curable coating composition, such as a UV curable coating composition or an E-beam curable coating composition; a mono-cure coating composition; a dual-cure coating composition; a lacquer coating composition; a waterborne coating composition or aqueous coating composition; a solvent borne coating composition; or any other coating compositions known to those skilled in the art. The coating composition can be formulated as a primer, a basecoat, or a color coat composition by incorporating desired pigments or effect pigments. The coating composition can also be formulated as a clearcoat composition.

The term "vehicle", "automotive", "automobile" or "automotive vehicle" can include an automobile, such as car, bus, truck, semi truck, pickup truck, SUV (Sports Utility Vehicle); tractor; motorcycle; trailer; ATV (all terrain vehicle); heavy duty mover, such as, bulldozer, mobile crane and earth mover; airplanes; boats; ships; and other modes of transport.

The term "formula", "matching formula" or "matching formulation" for a coating composition refers to a collection of information or instruction, based upon that, the coating composition can be prepared. In one example, a matching formula comprises a list of names and quantities of pigments, effect pigments, and other components of a coating composition. In another example, a matching formula comprises instructions on how to mix multiple components of a coating composition.

Figure 2:
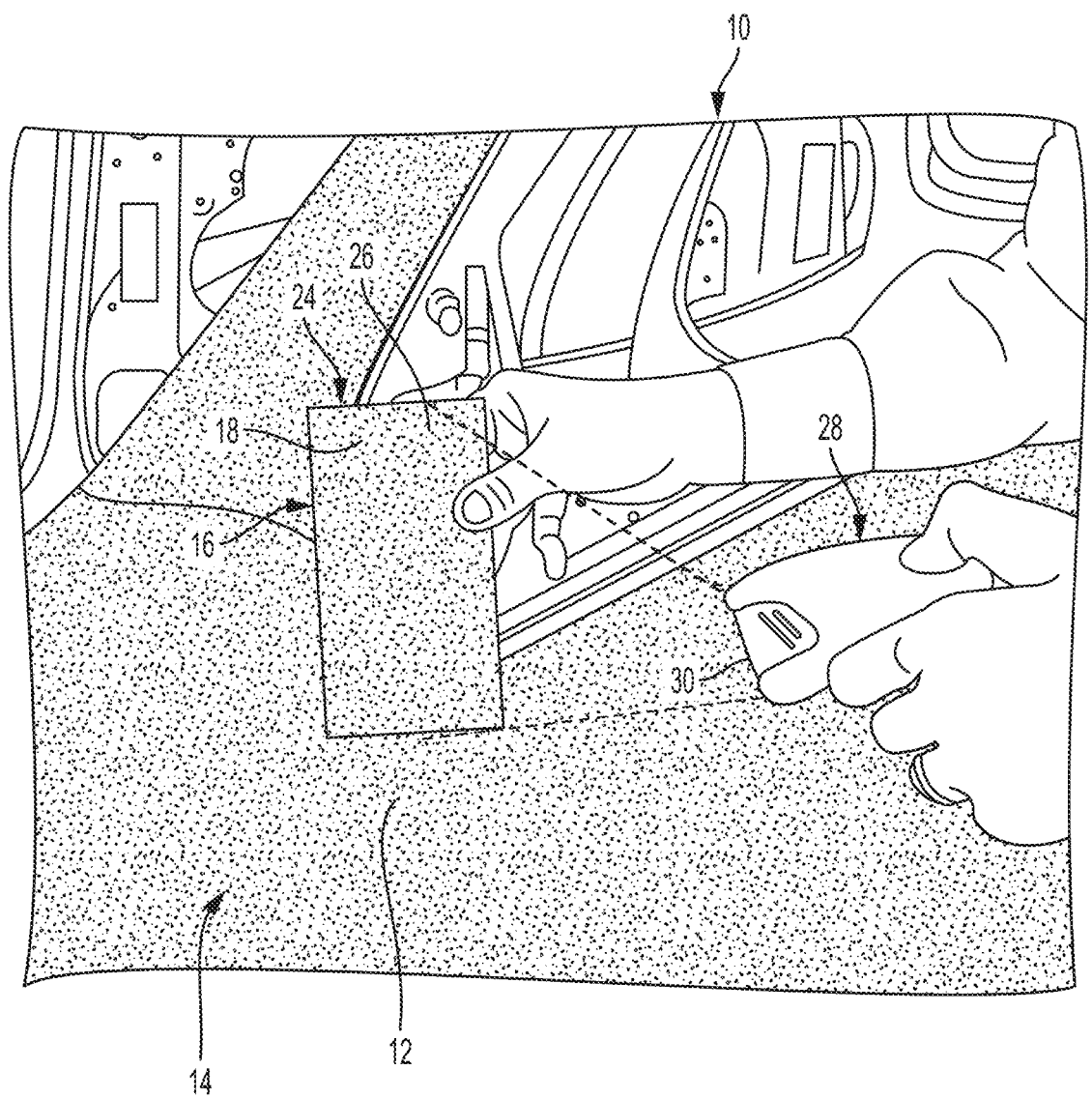
FIG. 2 is a schematic illustrating another non-limiting embodiment of a system for matching appearance of a target coating on a substrate utilizing a second coating chip.

System 10 for matching appearance of a target coating 12 on a substrate 14 is described with reference to FIGS. 1 and 2. The substrate 14 may be a vehicle body or parts of a vehicle body. The substrate 14 may also be any coated article including the target coating 12. The target coating 12 may include a color coat layer, a clearcoat layer, or a combination of a color coat layer and a clearcoat layer. The color coat layer may be formed from a color coat composition. The clearcoat layer may be formed from a clearcoat coating composition. The target coating 12 may be formed from one or more solvent borne coating compositions, one or more waterborne coating compositions, one or more two-pack coating compositions or one or more one-pack coating compositions. The target coating 12 may also be formed from one or more coating compositions each having a crosslinkable component and a crosslinking component, one or more radiation curable coating compositions, or one or more lacquer coating compositions.

The target coating 12 may be analyzed to determine target color data and target appearance data. The target color data may be stored in a formula database including any one or more of spectral reflectance values, XYZ values, L,a,b values, L*,a*,b* values, L,C,h values, or combinations thereof. The target color data can be produced from a color measuring device, an appearance measuring device or a color-appearance dual measuring device. The color measuring device can be a colorimeter, a spectrophotometer, or a goniospectrophotometer. Any suitable colorimeter or spectrophotometer, such as Model SP64 manufactured by X-Rite, Grandville, Mich. can be used. A goniospectrophotometer is also known as multi-angle spectrophotometer.

Any suitable Goniospectrophotometers, such as Model MA6811 from X-Rite, Grandville, Mich., or the ones provided by Murakami Color Research Laboratory, Tokyo, Japan, can be used. Examples of appearance or color-appearance dual measuring device can include BYK-mac, available from BYK-Gardner USA, Columbia, Md., that measures both multi-angle color and flake characterization. Typically, the target color data can be measured at one or more different angles, such as some or all of the angles at about 15°, 25°, 45°, 75°, or 110°, wherein definitions of angles can be specified by instrument manufacturers. Some devices can also measure color or appearance data at −15°. In one example, the target color data are measured at one mid aspecular angle of 45°. In another example, the target color data are measured at three angles of 15°, 45°, and 75°. In yet another example, the target color data are measured at five angles of 15°, 25°, 45°, 75°, and 110°.

In embodiments, the target coating 12 has a target color. The target color may be selected from a plurality of pre-defined colors. In embodiments, the target color is a chromatic color.

In embodiments, the target coating 12 is formed from a coating composition including an effect pigment with the effect pigment imparting a target coarseness. The effect pigment may include a metal-containing flake pigment, interference flake pigments, such as mica-based pearlescent pigments, or a combination thereof. In embodiments, the coating composition includes the effect pigment in an amount of at least about 2, at least about 20, at least about 40, at least about 50, or at least about 95, wt. % based on a total weight of the coating composition.

In embodiments, the target coating 12 has a target lightness. The target lightness may correspond to a target lightness value derived from the target color data. Typically, L or L* in L,a,b or L*,a*,b* color data defines the target lightness value. The target lightness value can therefore be derived from the L,a,b values or L*,a*,b* values. Target lightness values can facilitate determining the appropriate coarseness value of a coating that has effect pigments. Coarseness of a coating having one or more effect pigments may be related to the apparent size of the effect pigments in the coating when viewed by a person. The effect pigments of the same concentration and size distribution may have different apparent coarseness in coatings of different lightness.

The system 10 includes a coating chip 16. The coating chip 16 includes a chip coating layer 18. In embodiments, the system 10 includes a set of coating chips each including a chip coating layer 18 thereon, such as a first coating chip 20 (see FIG. 1) including a first chip coating layer 22 and a second coating chip 24 (see FIG. 2) including a second chip coating layer 26. It is to be appreciated that the set of coating chips may include more than two coating chips 16, such as a third coating chip including a third chip coating layer, a fourth coating chip including a fourth chip coating layer, etc.

In various embodiments, the chip coating layer 18 is formed from a coating composition including an effect pigment with the effect pigment imparting a chip coarseness. The effect pigment may include a metal-containing flake pigment, interference flake pigments, such as mica-based pearlescent pigments, or a combination thereof. In embodiments, the coating composition includes metal-containing flake pigment in an amount of at least about 2, at least about 20, at least about 40, at least about 50, or at least about 95 wt. % based on a total weight of the coating composition. The coating composition may further include other components, such as additional pigments, solvents, resin, catalysts, additives, and the like.

As introduced above, the chip coating layer 18 has a chip coarseness. The chip coarseness can vary depending on a number of factors, such as the type of the effect pigment, amount of the effect pigment, size of the effect pigment, configuration of the effect pigment, and the like. In embodiments, the coating chip 16 is utilized to determine the target coarseness of the target coating 12 by comparing the chip coarseness of the coating chip 16 to the target coarseness of the target coating 12.

In embodiments including the first chip coating layer 22 and the second chip coating layer 26, the first chip coating layer 22 has a first chip coarseness and the second chip coating layer 26 has a second chip coarseness. In certain embodiments, the first chip coarseness is different than the second chip coarseness. However, it is to be appreciated that the first chip coarseness may be the same as the second chip coarseness.

In various embodiments, the chip coating layer 18 has a chip lightness. In embodiments, the coating chip 16 is utilized to determine the target lightness of the target coating 12 by comparing the chip lightness of the coating chip 16 to the target lightness of the target coating 12.

Figure 3:
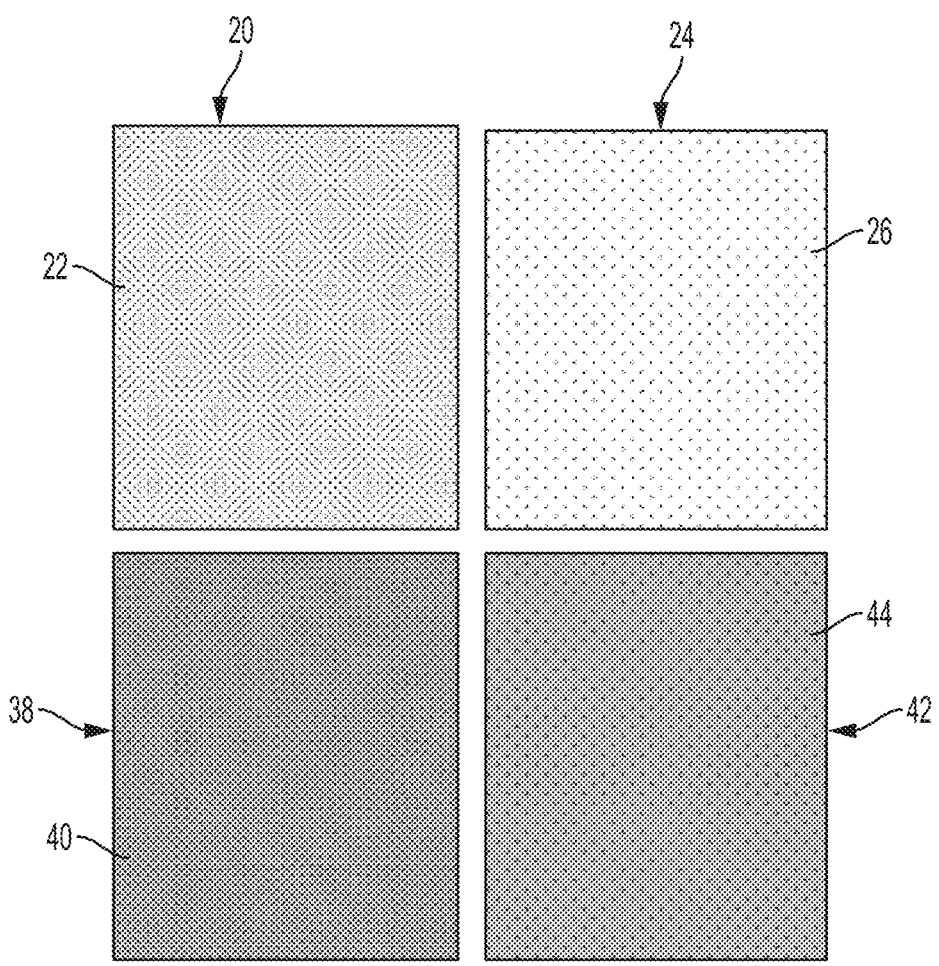
FIG. 3 is a schematic illustrating non-limiting embodiments of the first coating chip of FIG. 1 and the second coating chip of FIG. 2.

With reference to FIG. 3, in certain embodiments, the system 10 includes the first coating chip 20 having the first chip coating layer 22, the second coating chip 24 having the second chip coating layer 26, a third coating chip 38 having a third chip coating layer 40, and a fourth coating chip 42 having a fourth chip coating layer 44. The first chip coating layer 22 may have the first chip coarseness and a first chip lightness. The second chip layer coating 26 may have the second chip coarseness and the first chip lightness. The third chip coating layer 42 may have the third chip coarseness and the second chip lightness. The fourth chip coating layer 44 may have the fourth chip coarseness and the second chip lightness. In embodiments, the second chip coarseness may be different from the first chip coarseness and the fourth chip coarseness may be different from the third chip coarseness. However, it is to be appreciated that the first chip coarseness may be the same as the third chip coarseness or the fourth chip coarseness and the second chip coarseness may be the same as the third chip coarseness or the fourth chip coarseness so long as the first and second chip coarsenesses are different and the third and fourth chip coarsenesses are different.

The chip coating layer 18 has a neutral color. In embodiments, the term "neutral" with regard to the color of the chip coating layer 18 means that the chip coating layer has a low chroma value (C*). In embodiments, the C* value is less than about 10.0, less than about 8, or less than about 5. In one embodiment, the neutral color is further defined as an achromatic color. For example, when a red-colored light illuminates the chip coating layer 18 having the neutral color, the color of the light reflected back exhibits substantially the same red-color light. In contrast, when a red-colored light illuminates a chip coating layer having a non-neutral color, such as a blue color, the color of the light reflected back may be substantially different than the red-color light, such as a purple color. In embodiments, the neutral color is selected from the group of a silver color, a gray color, a white color, a beige color, and combinations thereof. In one embodiment, the neutral color is the silver color.

The system 10 further includes an illumination component 28 configured to illuminate the chip coating layer 18 with a light having an illumination color. It is to be appreciated that the chip coating layer 18 may have a neutral color prior to illumination by the illumination component 28. The illumination color may be selected from the plurality of predefined colors to be similar to the target color of the target coating 12. In embodiments, the illumination color and the target color have a Δ hue angle of no greater than about 30°, no greater than about 20°, or no greater than about 10°. Illumination of the chip coating layer 18 with the light having the illumination color may result in the chip coating layer 18 exhibiting a color different than the neutral color. The illumination component 28 may direct the light having the illumination color toward the chip coating layer 18 thereby illuminating the chip coating layer 18. As described above, the neutral color of the chip coating layer 18 minimally impacts the color of the light reflected back from the chip coating layer 18 such that the chip coating layer 18 exhibits a color similar to the illumination color during illumination of the chip coating layer 18 by the light having the illumination color.

In embodiments, the illumination component 28 includes a light source 30. The light source 30 may include any light source known in the art for illumination. In certain embodiments, the light source 30 includes a light-emitting diode ("LED") lamp, an incandescent lamp, a fluorescent lamp, a compact fluorescent lamp ("CFL"), a cold cathode fluorescent lamp ("CCFL"), a high-intensity discharge ("HID") lamp, or combinations thereof. In other embodiments, the light source 30 is daylight generated from the sun. In one embodiment, the light source 30 includes a LED lamp. In certain embodiments, the light source 30 is a hand-held portable lamp. However, it is to be appreciated that the light source may be a free-standing lamp.

The light source 30 may be configured to generate the light having a first color. The first color may be selected from the plurality of predefined colors. In one embodiment, the light having the first color is further defined as the light having the illumination color such that the chip coating layer 18 exhibits the chip coarseness and the illumination color in the presence of the light having the first color. For example, the light source 30 may be configured to generate a light having a red color, with the red color being the first color, such that the chip coating layer 18 exhibits the chip coarseness and the red color in the presence of the light having the red color. In an exemplary embodiment, the light source 30 includes a multi-color white LED lamp. The multi-color white LED lamp may be configured to generate red-colored light, green-colored light and blue-colored light, and to control blending and diffusion of the red-colored light, green-colored light and blue-colored light. In embodiments, the chip coating layer 18 exhibits a Δ hue angle in the presence of light having the illumination color.

Figure 4:
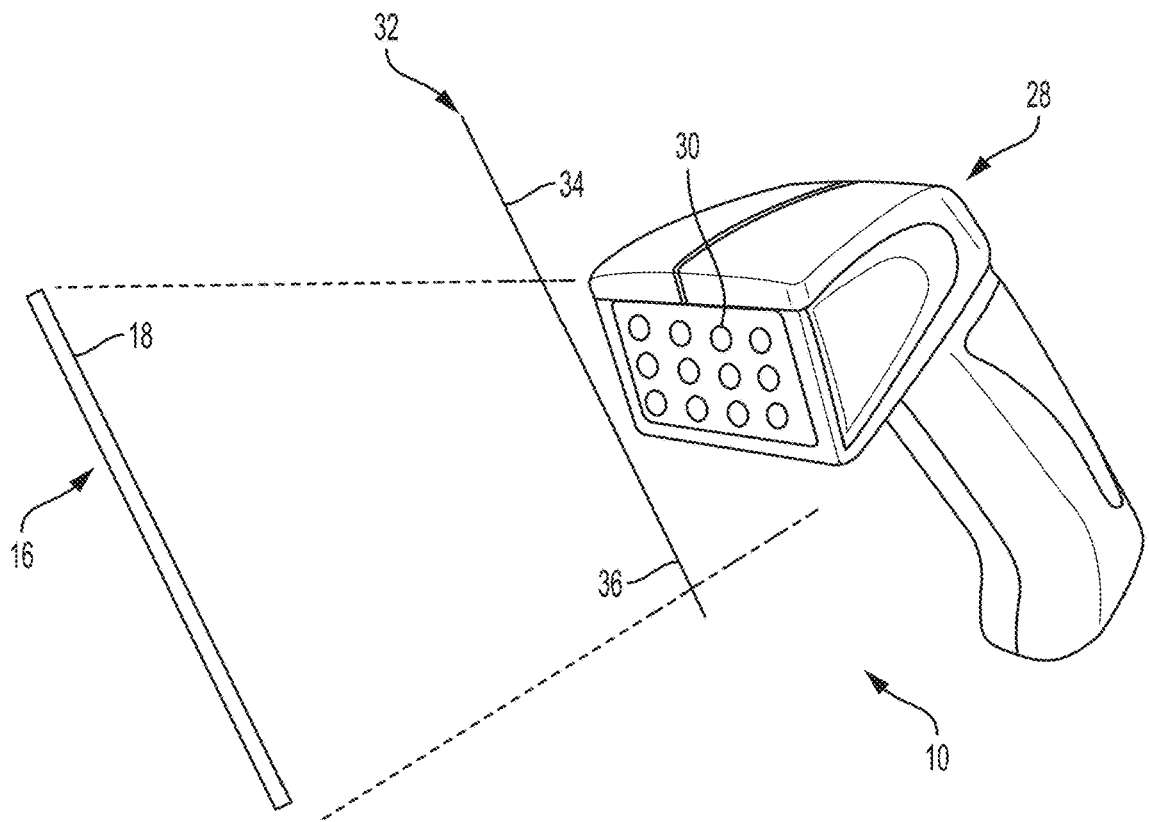
FIG. 4. is a schematic illustrating a non-limiting embodiment of the system of FIG. 1 or FIG. 2 including an illumination component which includes a light source and a filter.
Figure 5:
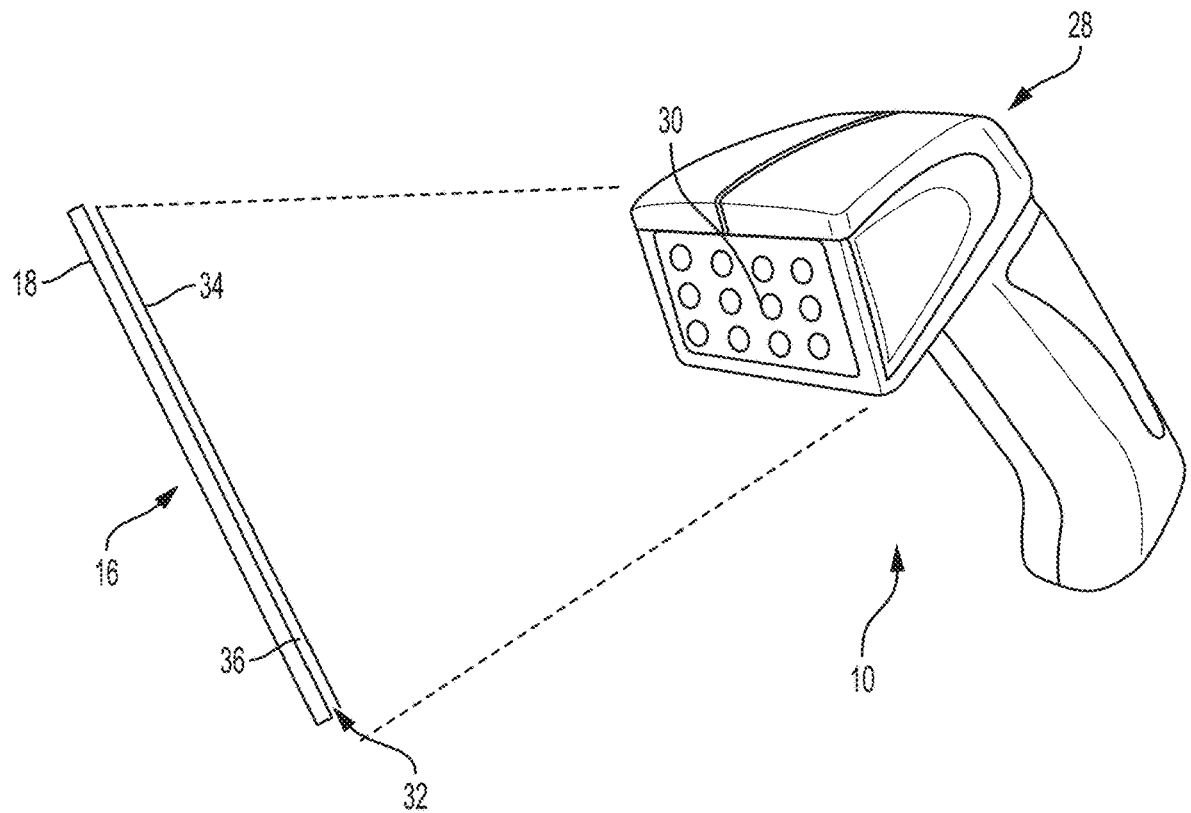
FIG. 5 is a schematic illustrating another non-limiting embodiment of the system of FIG. 1 or FIG. 2 including an illumination component which includes a light source and a filter.

With reference to FIGS. 4 and 5, in various embodiments, the illumination component 28 includes a filter 32 configured to receive the light having the first color which may be generated by the light source 30. The filter 32 is further configured to emit a light having a second color in response to receiving the light having the first color. The second color may be selected from the plurality of predefined colors. In one embodiment, the light having the second color is further defined as the light having the illumination color such that the chip coating layer 18 exhibits the chip coarseness and the illumination color in the presence of the light having the second color. For example, the light source 30 may be configured to generate a light having a white color, with the white color being the first color. The light having the white color may be received by the filter 32 and the filter 32 may emit a light having a red color, with the red color being the second color, in response to receiving the light having the white color such that the chip coating layer 18 exhibits the chip coarseness and the red color in the presence of the light having the red color. As another example, the light source 30 may be sun and thus configured to generate a light having a white color such as daylight, with the white color being the first color. The light having the white color may be received by the filter 32 and the filter 32 may emit a light having a red color, with the red color being the second color, in response to receiving the light having the white color such that the chip coating layer 18 exhibits the chip coarseness and the red color in the presence of the light having the red color. As described above, in embodiments, the chip coating layer 18 exhibits a Δ hue angle in the presence of light having the illumination color.

In various embodiments, the filter 32 is a film layer having a first surface 34 and a second surface 36 opposite the first surface 34. The first surface 34 is configured to receive the light having the first color and the second surface 36 is configured to emit the light having the second color. Non-limiting examples of suitable film layers may include, but not be limited to laquered gelatin films, doped glasses, or interference coatings, and the like. The filter 32 may be transparent and may have a film color such that the light having the first color received by the film layer is emitted as the light having the second color. The film color may be selected from the plurality of predefined colors. The system 10 may include a plurality of filters 32 with each filter 32 having a different filter color. The filter 32 may have a thickness of from about 0.5 to about 10.0 mm.

With reference to FIG. 4, the filter 32 may be disposed proximate the light source 30 with the second surface 36 facing the chip coating layer 18 and the first surface 34 facing the light source 30. In embodiments, the filter 32 is removably coupled to the light source 30. A user of the system 10 can select the filter 32 having the filter color similar to the target color from the plurality of filters and then couple the filter 32 to the light source 30.

With reference to FIG. 5, the filter 32 may be disposed proximate the chip coating layer 18 with the second surface 36 facing the chip coating layer 18 and the first surface 34 facing the light source 30. In embodiments, the filter 32 is disposed overlying the chip coating layer 18. A user of the system 10 can select the filter 32 having the filter color similar to the target color from the plurality of filters and then dispose the filter 32 on the chip coating layer 18.

Alternatively, the system 10 further includes a means for illuminating the chip coating layer 18 with the light having the illumination color. The means for illuminating the chip coating layer 18 may include the illumination component 28 as described above. In embodiments, the means for illuminating the chip coating layer 18 further includes a means for generating the light having the first color. The means for generating the light having the first color may include the light source 30 as described above. In certain embodiments, the means for illuminating the chip coating layer 18 may further include a means for receiving the light having the first color and emitting the light having the second color. The means for receiving the light having the first color and emitting the light having the second color may include the filter 32 as described above.

Figure 6:
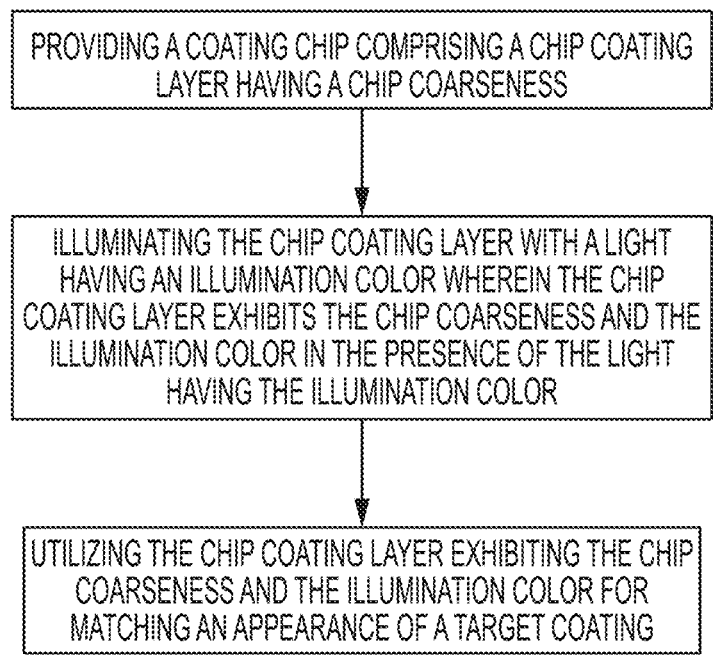
FIG. 6 is a flow chart illustrating a non-limiting embodiment of a method for matching appearance of a target coating on a substrate utilizing the system of FIG. 1 or FIG. 2.

A method for matching appearance of the target coating 12 on the substrate 14 is described with reference to FIG. 6 and continuing reference to FIGS. 1-5. The target coating 12 has the target color and the target coarseness. The method includes providing the coating chip 16 including the chip coating layer 18 having the chip coarseness. In embodiments, the step of providing is further defined as providing the first coating chip 20 including the first chip coating layer 22 having the first chip coarseness and providing the second coating chip 24 including the second chip coating layer 26 having the second chip coarseness.

The method further includes illuminating the chip coating layer 16 with the light having the illumination color. The chip coating layer 16 exhibits the chip coarseness and the illumination color in the presence of the light having the illumination color. In embodiments, the step of illuminating is further defined as illuminating at least one of the first chip coating layer 22 and the second chip coating layer 26 with the light having the illumination color. The first chip coating layer 22 exhibits the first chip coarseness and the illumination color in the presence of the light having the illumination color. The second chip coating layer 26 exhibits the second chip coarseness and the illumination color in the presence of the light having the illumination color. In certain embodiments, both the first chip coating layer 22 and the second chip coating layer 26 are illuminated with the light having the illumination color.

In embodiments, the method includes selecting the illumination color similar to the target color from the plurality of predefined colors. For example, in embodiments when the target color is a red color, the user may select a red color as the illumination color.

In one embodiment, illuminating at least one of the first chip coating layer 22 and the second chip coating layer 26 with the light having the illumination color includes generating the light having the first color, and aligning the light having the first color with at least one of the first chip coating layer 22 and the second chip coating layer 26 such that at least one of the first chip coating layer 22 and the second chip coating layer 26 is illuminated with the light having the first color.

In another embodiment, illuminating at least one of the first chip coating layer 22 and the second chip coating layer 26 with the light having the illumination color includes generating the light having the first color, providing the filter 32 configured to receive the light having the first color and emit the light having the second color, and aligning the filter 32 with the light having the first color and at least one of the first chip coating layer 22 and the second chip coating layer 26 such that at least one of the first chip coating layer 22 and the second chip coating layer 26 is illuminated with the light having the second color.

The method further includes utilizing the chip coating layer 18 exhibiting the chip coarseness and the illumination color for matching the appearance of the target coating. In embodiments, the step of utilizing is further defined as obtaining a target coarseness value corresponding to the target coarseness based on the first chip coarseness of the first chip coating layer 22 and the second chip coarseness of the second chip coating layer 26 for matching the appearance of the target coating 12. In embodiments, obtaining the target coarseness value includes selecting from the first coating chip 20 and the second coating chip 24 a matching coating chip having a coarseness that matches the target coarseness and producing the target coarseness value based on the coarseness of the matching coating chip.

In certain embodiments, the method may include providing the first coating chip 20 including the first chip coating layer 22, providing the second coating chip 24 including the second chip coating layer 26, providing the third coating chip 38 including the third chip coating layer 40, and providing the fourth coating chip 42 including the fourth chip coating layer 44. The first chip coating layer 22 may have the first chip lightness and the first chip coarseness. The second chip coating layer 26 may have the first chip lightness and the second chip coarseness that is different from the first chip coarseness. The third chip coating layer 40 may have the second chip lightness that is different from the first chip lightness and the third chip coarseness. The fourth chip coating layer 44 may have the second chip lightness and the fourth chip coarseness that is different from the third chip coarseness;

In these embodiments, the method further includes obtaining target color data of the target coating and producing a target lightness value based on the target color data. Based on the target lightness value produced, the method includes selecting at least one of the first chip coating layer 22, the second chip coating layer 26, the third chip coating layer 40, and the fourth chip coating layer 44 having a chip lightness that substantially matches the target lightness value. It is to be appreciated that the chip lightness of the chip coating layers 18 may be represented by a chip lightness value such a user can select the chip lightness value the substantially matched the target lightness value.

In these embodiments, the method further includes illuminating the one or more chip coating layers that have been selected as substantially matching the target lightness value with the light having the illumination color. The first chip coating layer 22 may exhibit the first chip coarseness, the first chip lightness, and the illumination color in the presence of the light having the illumination color. The second chip coating layer 26 may exhibit the second chip coarseness, the first chip lightness, and the illumination color in the presence of the light having the illumination color. The third chip coating layer 40 may exhibit the third chip coarseness, the second chip lightness, and the illumination color in the presence of the light having the illumination color. The fourth chip coating layer 44 may exhibit the fourth chip coarseness, the second chip lightness, and the illumination color in the presence of the light having the illumination color.

In these embodiments, the method further includes obtaining the target coarseness value corresponding to the target coarseness based on the first chip coarseness of the first chip coating layer 22, the second chip coarseness of the second chip coating layer 26, the third chip coarseness of the third chip coating layer 40, and the fourth chip coarseness of the fourth chip coating layer 44 for matching the appearance of the target coating 12.

Coarseness of the target coating 12 and the chip coating layers 18 can be compared visually under one or more viewing angles, one or more illumination conditions, or a combination thereof. The viewing angles can range from near 90 degrees meaning viewing from near the surface of the target coating to about 0 degree meaning viewing perpendicularly relative to the surface of the target coating. The illumination conditions can include different illumination light intensities, different illumination spectral power distributions, different illumination light angles, or combinations thereof. The coating chips that provide the closest match to the target coating in terms of coarseness can be selected as the matching coating chip. The target coarseness value can be determined based on the coarseness values of the matching coating chip.

The coating chips 16 can be assembled in various forms of strips in that multiple coating chips 16 can be arranged side-by-side. The coating chips 16 can also be assembled in a form of fandeck in that multiple coating chips can be stacked in a pile and held together at one portion of each of the chips by a fixture so that the multiple chips can be freely spread out like a "fan" to display each of the chips. Each of the coating chips 16 can have one or more viewing openings so when the coating chips 16 are placed over the target coating, the target color and the target coarseness of the target coating can be viewed through the viewing openings. Each of the coating chips 16 can have a chip ID value.

The chip coating layers 18 can be on one surface of each of the coating chips 16. The other surface of each coating chip 16 can have identification information such as lightness value, coarseness value, coating formula identification, chip ID value, or any other information useful for identify the coating chip 16. To reduce the total number of coating chips 16, the coating chips 16 can also have chip coating layers 18 on both surfaces of each of the chips.

The coating chips 16 can be produced on paper, plastic, fabric, polymeric or metal materials. The coating chips 16 can be produced on a thin substrate made of any of the aforementioned materials. The coating chips 16 can be in a square, an oval, a circular, or any other shapes. Multiple coating chips 16 can be arranged or assembled in a strip or a fandeck form. The coating chips 16 can have one or more viewing openings through the chip coating layer 18 and the thin substrate.

The chip coating layer 18 can include a color coat layer formed from a color coat coating composition. The color coat layer can comprise one or more effect pigments. In one example, the effect pigment is selected from metallic pigments, pearlescent pigments, or a combination thereof. The chip coating layer 18 can further comprise a clearcoat layer formed form a clearcoat composition.

The chip coating layer 18 of each of the coating chips 16 can be formed at different coarseness. Colored tints, such as black tints can be used to shade the color coat layer into different lightness. Examples of the color tints can include MasterTint® Tint system available from Axalta Coating Systems, Wilmington, USA, under registered trademark. Effect pigments such as aluminum flakes can be used to produce different levels of coarseness of the color coat layer. Examples of effect pigments can include aluminum tints available from aforementioned Master® Tint system from Axalta Coating Systems. The coarseness can also be produced by a combination of colored tints and the effect pigments.

The range of coarseness can be determined based on coarseness values of articles available. In automobile refinish industry, coatings of a number of selected vehicles can be measured or provided by vehicle manufacturers. The selected vehicles can include different makes, models, manufacturing years, and manufacturing sites. Measurements of vehicles can be done at railway heads, vehicle transportation hubs, import harbors for imported foreign vehicles, or any other places or facilities where a large number and variety of vehicles can be accessed. In one example, a chip ID C1 can represent the finest coarseness value, a chip ID C5 can represent the coarsest coarseness value, and chip IDs C2-C4 can represent intermediate coarseness values between C1 and C5. Each of the coarseness values can be achieved by using different types, size, or a combination of different types or sizes of effect pigments, such as various aluminum flakes. If desired, more values of coarseness can be used. In further example, 10 coarseness values can be used in a chip set.

The chip coating layer 18 may have lightness values selected from actual color data values, actual lightness values, lightness ID values, index values, or combinations thereof. In one example, twenty-five coating chips 16 can be arranged into five lightness groups each having a lightness ID value assigned, such as L1-L5. Each lightness ID value can be used to match a range of color data values or actual lightness values. For example, coating chips with a lightness ID value of L1 can match target lightness values in a range of from 5 to 20, or any lightness values under 20. In another example, the coating chips 16 with a lightness ID value of L2 can match target lightness values in a range of from 21 to 40. The range of lightness ID values and the matching lightness values can be arranged as desired.

The coating chips 16 within each lightness group can have matching lightness values and different coarseness values. The coarseness values can be selected from actual coarseness measurement data values, coarseness ID values, index values, or a combination thereof. In one example, each lightness group can have five coating chips 16 each having matching lightness values and different coarseness values. The coating chips 16 can have coarseness ID values such as C1-C5. Each coating chip can match coatings with a range of coarseness values.

Each coating chip 16 from the set can have a unique chip ID value that can identify lightness and coarseness values of the coating chip. In one example, the coating chips in L1 lightness group can have chip IDs such as L1C1-L1C5, the coating chips 16 in L5 lightness group can have chip IDs such as L5C1-L5C5, and so on.

The set of coating chips 16 can include at least two coating chips 16 having different lightness values, and at least two coating chips having matching lightness values and different coarseness values. Typically, the set of coating chips 16 can have 2 to 20 different coarseness values and 2 to 20 lightness values. Suitable coating chips are described in U.S. Pat. No. 8,743,364, herein incorporated by reference in its entirety.

The method and the system disclosed herein can be used for any coated articles having coating layers comprising effect pigments. Some examples of such coated articles can include, but not limited to, home appliances, such as refrigerator, washing machine, dishwasher, microwave ovens, cooking and baking ovens; electronic appliances, such as television sets, computers, electronic game sets, audio and video equipment; recreational equipment, such as bicycles, ski equipment, all-terrain vehicles; and home or office furniture, such as tables, file cabinets; water vessels or crafts, such as boats, yachts, or personal watercrafts (PWCs); aircrafts; buildings; structures, such as bridges; industrial equipment, such as cranes, heavy duty trucks, or earth movers; or ornamental articles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for matching appearance of a target coating having a target color and a target coarseness on a substrate, the method comprising:
    providing a first coating chip comprising a first chip coating layer having a first chip coarseness;
    providing a second coating chip comprising a second chip coating layer having a second chip coarseness that is different from the first chip coarseness;

selecting an illumination color having a hue angle of no greater than about 30° to the target color from a plurality of predefined colors;

illuminating at least one of the first chip coating layer and the second chip coating layer with a light having the illumination color;

wherein the first chip coating layer exhibits the first chip coarseness and the illumination color in the presence of the light having the illumination color, and wherein the second chip coating layer exhibits the second chip coarseness and the illumination color in the presence of the light having the illumination color; and obtaining a target coarseness value corresponding to the target coarseness based on the first chip coarseness of the first chip coating layer and the second chip coarseness of the second chip coating layer for matching the appearance of the target coating.

2. The method according to claim 1, wherein obtaining the target coarseness value comprises:

selecting from the first coating chip and the second coating chip a matching coating chip having a coarseness that matches the target coarseness; and producing the target coarseness value based on the coarseness of the matching coating chip.

3. The method according to claim 1, wherein illuminating at least one of the first chip coating layer and the second chip coating layer with a light having the illumination color comprises:

generating a light having a first color; and aligning the light having the first color with at least one of the first chip coating layer and the second chip coating layer such that at least one of the first chip coating layer and the second chip coating layer is illuminated with the light having the first color.

4. The method according to claim 1, wherein illuminating at least one of the first chip coating layer and the second chip coating layer with a light having an illumination color comprises:

generating a light having a first color;

providing a filter configured to receive the light having the first color and emit a light having a second color; and aligning the filter with the light having the first color and at least one of the first chip coating layer and the second chip coating layer such that at least one of the first chip coating layer and the second chip coating layer is illuminated with the light having the second color.

5. The method according to claim 1, wherein the first chip coating layer and the second chip coating layer have a first chip lightness, and wherein the method further comprises:

providing a third coating chip comprising a third chip coating layer having;

a second chip lightness that is different from the first chip lightness, and a third chip coarseness;

providing a fourth coating chip comprising a fourth chip coating layer having;

the second chip lightness, and a fourth chip coarseness that is different from the third chip coarseness;

obtaining target color data of the target coating and producing a target lightness value based on the target color data;

selecting at least one of the first chip coating layer, the second chip coating layer, the third chip coating layer, and the fourth chip coating layer having a chip lightness that substantially matches the target lightness value;

illuminating the one or more chip coating layers selected with the light having the illumination color;

wherein the first chip coating layer exhibits the first chip coarseness, the first chip lightness, and the illumination color in the presence of the light having the illumination color, wherein the second chip coating layer exhibits the second chip coarseness, the first chip lightness, and the illumination color in the presence of the light having the illumination color, wherein the third chip coating layer exhibits the third chip coarseness, the second chip lightness, and the illumination color in the presence of the light having the illumination color, and wherein the fourth chip coating layer exhibits the fourth chip coarseness, the second chip lightness, and the illumination color in the presence of the light having the illumination color; and obtaining a target coarseness value corresponding to the target coarseness based on the first chip coarseness of the first chip coating layer, the second chip coarseness of the second chip coating layer, the third chip coarseness of the third chip coating layer, and the fourth chip coarseness of the fourth chip coating layer for matching the appearance of the target coating.

* * * * *